(12) United States Patent
Fraleigh

(10) Patent No.: US 6,698,986 B2
(45) Date of Patent: Mar. 2, 2004

(54) METHOD AND MEANS FOR MOUNTING A TOILET STOOL

(76) Inventor: William T. Fraleigh, One Beach Dr., Suite 1607, St. Petersburg, FL (US) 33701

(*) Notice: Subject to any disclaimer, the term of this patent is extended or adjusted under 35 U.S.C. 154(b) by 0 days.

(21) Appl. No.: 09/799,278

(22) Filed: Mar. 5, 2001

(65) Prior Publication Data

US 2001/0008600 A1 Jul. 19, 2001

Related U.S. Application Data

(63) Continuation-in-part of application No. 09/516,573, filed on Mar. 1, 2000, which is a continuation of application No. 09/143,936, filed on Aug. 31, 1998, now abandoned.

(51) Int. Cl.[7] ............................ F16B 37/08; F16B 39/22
(52) U.S. Cl. .................. 411/301; 411/433; 411/512; 411/907
(58) Field of Search ................................ 411/301, 302, 411/433, 435, 512, 542, 907

(56) References Cited

U.S. PATENT DOCUMENTS

| | | | |
|---|---|---|---|
| 1,093,434 A | | 4/1914 | Kent |
| 3,131,742 A | * | 5/1964 | Munse ........................ 411/301 |
| 3,188,293 A | | 6/1965 | Curry |
| 3,846,851 A | | 11/1974 | Pepper |
| 3,905,052 A | | 9/1975 | Deangelis |
| 4,185,334 A | | 1/1980 | Izzi |
| 4,530,629 A | | 7/1985 | Sakow |
| 4,990,044 A | * | 2/1991 | Kimak ................... 411/435 X |
| 5,054,163 A | * | 10/1991 | Sterling et al. ......... 411/435 X |

* cited by examiner

Primary Examiner—Neill Wilson

(57) ABSTRACT

A mounting bolt for use in mounting toilet stools has upper and lower ends with an elongated threaded shank therebetween. An elongated planar head is on the lower end of the bolt and has a width similar to the diameter of the shank, and a longitudinal length larger than the diameter of the shank. The head has a center axis extending along its length. An indicia mark is on the upper end of the bolt visually indicating the position of the center axis to assist the placement and tightening of a threaded nut on the upper end when the position of the head is concealed when the nut is being threadably mounted on the upper end of the bolt.

3 Claims, 7 Drawing Sheets

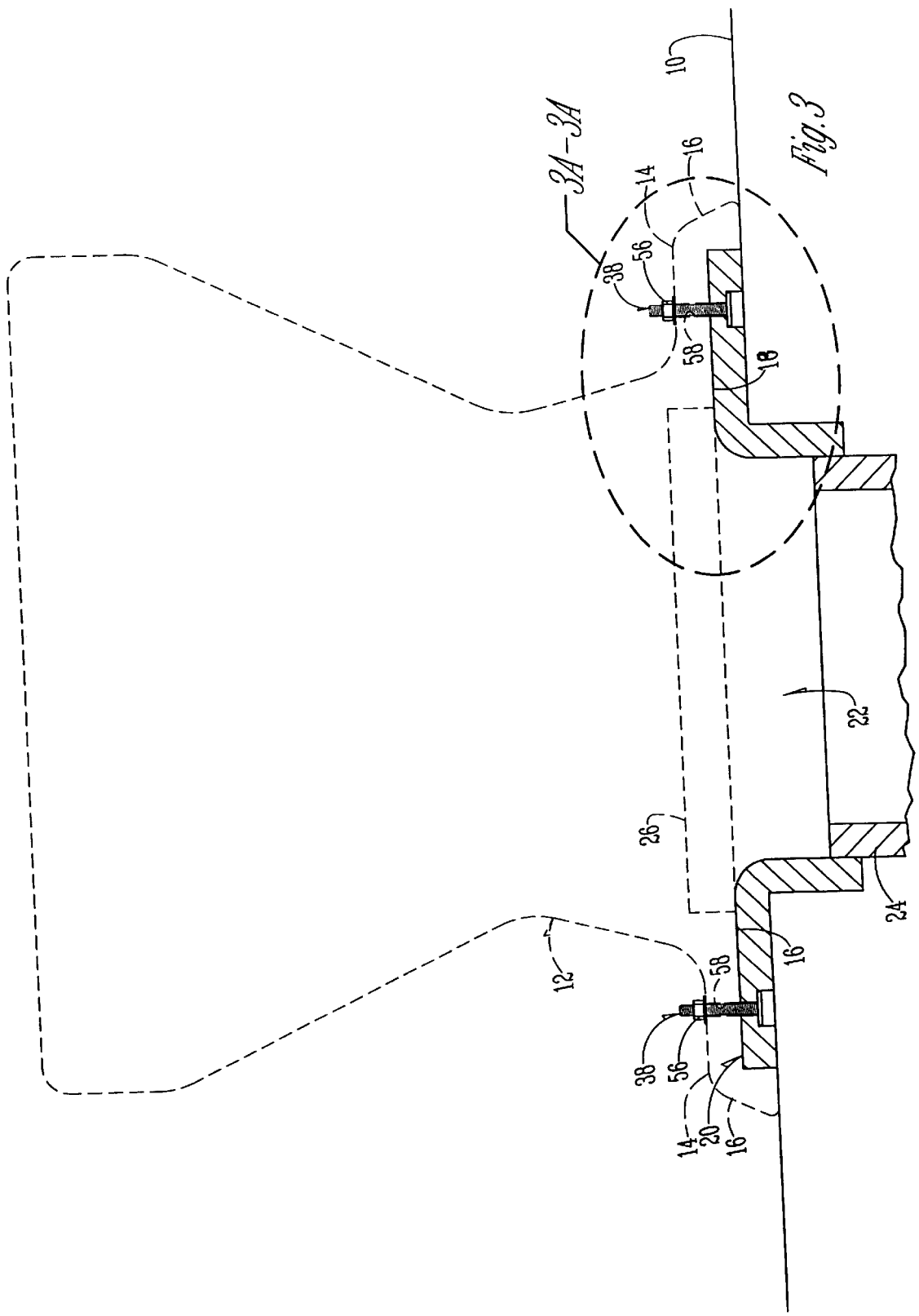

METHOD AND MEANS FOR MOUNTING A TOILET STOOL

CROSS-REFERENCE TO A RELATED APPLICATION

This application is a continuation-in-part of U.S. Patent Application Ser. No. 09/516,573 filed Mar. 1, 2000 which is a continuation of Ser. No. 09/143,936 filed Aug. 31, 1998, now abandoned. Priority of this application is also based on Provisional Application Serial No. 60/180,725 entitled "Push On Retaining Ring" filed on or about Feb. 1, 2001; and on Provisional Application Ser. No. 60/263,284 entitled "Fraleigh Toilet Unit and Cap" filed on or about Jan. 15, 2001.

BACKGROUND OF THE INVENTION

Toilet stools typically have universally accepted components for mounting the same on a floor surface. The toilet stool has a horizontal base with a perimeter portion to rest on and engage the floor surface. A recess opening appears on the underside thereof within the perimeter portion. A floor ring is fitted within the recess opening and has a center opening, and a perimeter floor engaging horizontal flange. The center opening is in communication with the downwardly extending sewer pipe.

A pair of oppositely disposed slots are typically formed in the flange and comprise a wide portion terminating in an elongated narrow portion. The slots extend vertically through the flange. The narrow portion of the slot has lower edges terminating in a groove extending along the edges. The groove has a width greater than the narrow portion of the slot.

Conventionally, a bolt which has upper and lower ends with the lower end having a planar head is mounted within the narrow portion of the slot with the planar head on the lower end thereof positioned in the aforementioned groove. The planar head on the bolt has a width similar to that of the narrow portion of the slot, and a longitudinal length greater than the width of the narrow portion. The longitudinal length of the head has a center axis which is typically positioned by turning the bolt so that the center axis extends across the width of the narrow portion of the slot.

The problem with this conventional structure is that when the installer places a nut on the upper end of the bolt to tighten the nut against the base of the toilet stool, the perimeter portion of the stool hides the position of the head of the bolt from the installer. Thus, if the center axis of the planar head of the bolt is aligned with the narrow portion of the slot, the tightening of a nut on the upper end of the bolt will merely pull the head of the bolt through the width of the narrow portion of the slot.

The head of the bolt is inserted into a slotted opening in the floor flange. The proper position is obtained by sliding the bolt along the slot. The problem with this conventional method is that once the bolts are in position there are no means, or inadequate means, of holding the bolts in a secure position. Since it is very difficult for the installer to see both bolts at the same time, the bolts can be accidentally knocked out of position when lowering the toilet stool onto the bolts.

A further problem exists with most conventional bolt caps that cover the exposed portion of the toilet bolts. In many cases the caps are not watertight and can be accidentally knocked off.

A further problem in mounting toilets is in handling the bolts, screw and fastening devices where objects are joined together it is difficult because of location or space or the design of the objects to physically or mechanically hold one part of the fastening device in a secure position necessary to place or mount objects together while applying the other or second part of the fastening device.

It is therefore a principal object of this invention to provide an indicia mark on the upper end of the bolt which is in alignment with the center axis of the longitudinal length of the planar head so that the installer, by observing the indicia marks on the upper end of the bolt, can turn the bolt and be assured that the center axis of the head is transverse of the narrow portion of the slot.

A further object of this invention is to provide a more efficient and inexpensive toilet bolt and toilet bolt cap that will save wasted time and loss of materials.

The principal object of this invention is to provide an inexpensive way of securing parts of a fastening device used in the application of joining objects together or mounting objects.

These and other objects will be apparent to those skilled in the art.

SUMMARY OF THE INVENTION

A mounting bolt for use in mounting toilet stools has upper and lower ends with an elongated threaded shank therebetween. An elongated planar head is on the lower end of the bolt and has a width similar to the diameter of the shank, and a longitudinal length larger than the diameter of the shank. The head has a center axis extending along its length. An indicia mark is on the upper end of the bolt visually indicating the position of the center axis to assist the placement and tightening of a threaded nut on the upper end when the position of the head is concealed when the nut is being threadably mounted on the upper end of the bolt.

A push-on threaded ring makes a tight connection between the bolt head and the floor flange. The ring is of a suitable diameter and is constructed of a flexible material with the center or hub section thicker in depth allowing for a threaded opening to be placed in the center. The outer edge of the push-on retaining ring is provided with raised point or knobs to facilitate turning. Therefore the push-on retaining ring, being flexible, can be easily pushed on to the fastening device and then turned with the help of the raised points or knobs. The internal threads in the center or hub of the ring allow it to be tightened in order to hold the fastening device in the proper position.

A threaded (female) opening in the center of the cap, and a seal ring is in the base of the cap, allowing the cap to be threaded onto the top section of the toilet bolt, making the cap watertight and secure, therefore preventing it from being accidentally knocked off and eliminating the problem from water rusting or corroding the bolt, nut and washer.

The method comprises aligning the indicia mark in a direction transverse of the narrow portion of an elongated slot in a floor ring so as to enable the installer to simultaneously position the long dimension of the planar head in a transverse direction with respect to the narrow portion of the slot to permit the head from pulling through the slot when a tightening bolt on the upper end of the bolt is used to tighten the base of the toilet stool to the floor ring.

BRIEF DESCRIPTION OF THE DRAWINGS

FIG. 3 is a sectional view taken on line 3—3 of FIG. 2;

DESCRIPTION OF THE PREFERRED EMBODIMENT

Figure 3A:
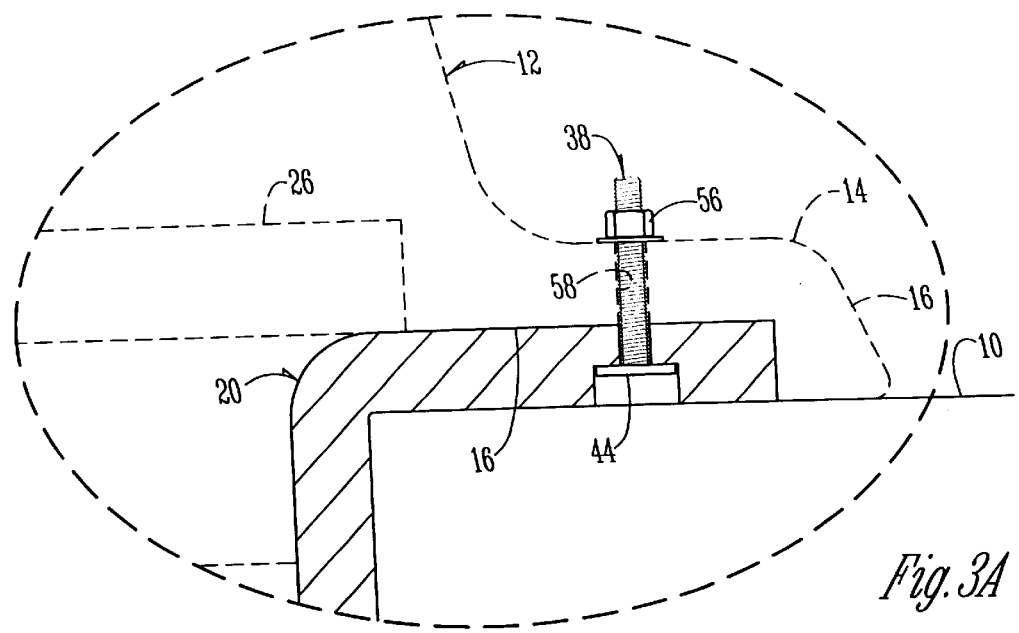
FIG. 3A is an enlarged scale sectional view taken on line 3A—3A of FIG. 3 but with the mounting bolt removed.

The numeral 10 designates a conventional floor surface. A conventional toilet stool 12 has a base 14, a perimeter portion 16, and a centrally located recess 18 in the bottom central portion thereof (FIG. 3).

A conventional floor ring 20 (modified as described below) has a center opening 22 which terminates in a downwardly extending sewer pipe 24. A conventional wax ring 26 is mounted on top of ring 20 and serves to seal the stool to the ring when the installation is completed. The floor ring 20 is nested within the recess 18 of the base 14 of stool 12.

Figure 4:
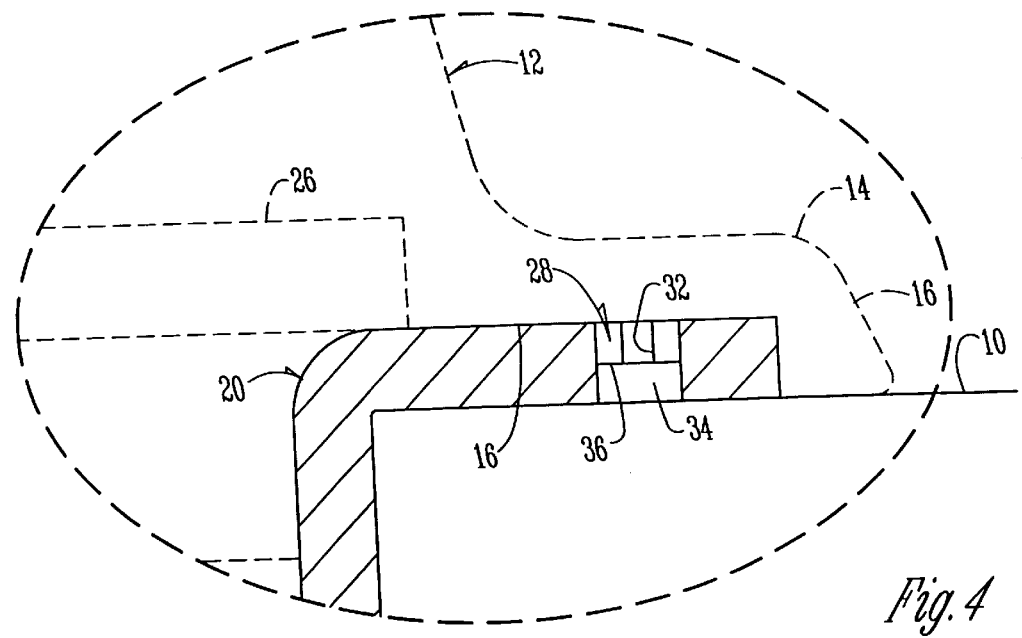
FIG. 4 is an enlarged scale sectional view taken on line 4—4 of FIG. 2.
Figure 5:
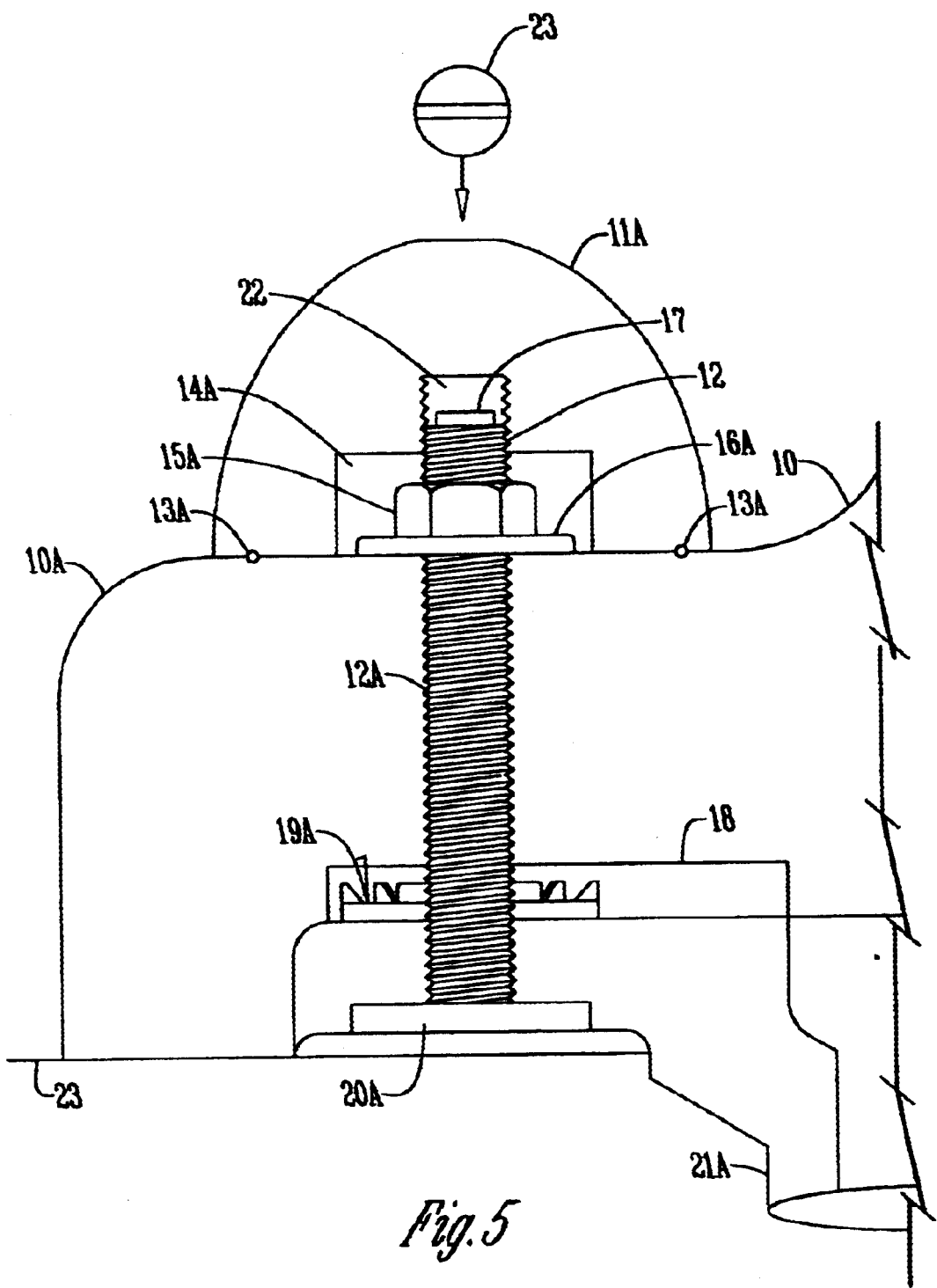
FIG. 5 is a sectional view through an alternate form of the invention.
Figure 6:
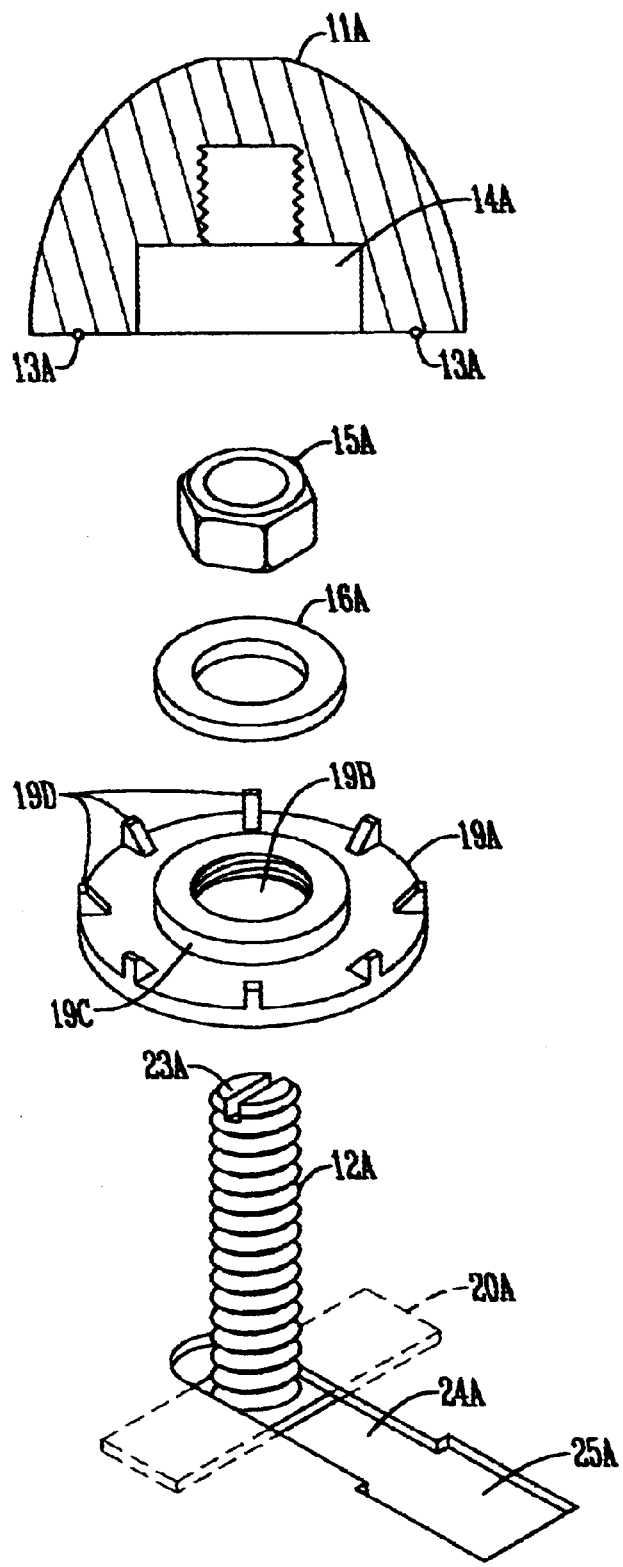
FIG. 6 is an exploded view of the structure of FIG. 5.
Figure 7:
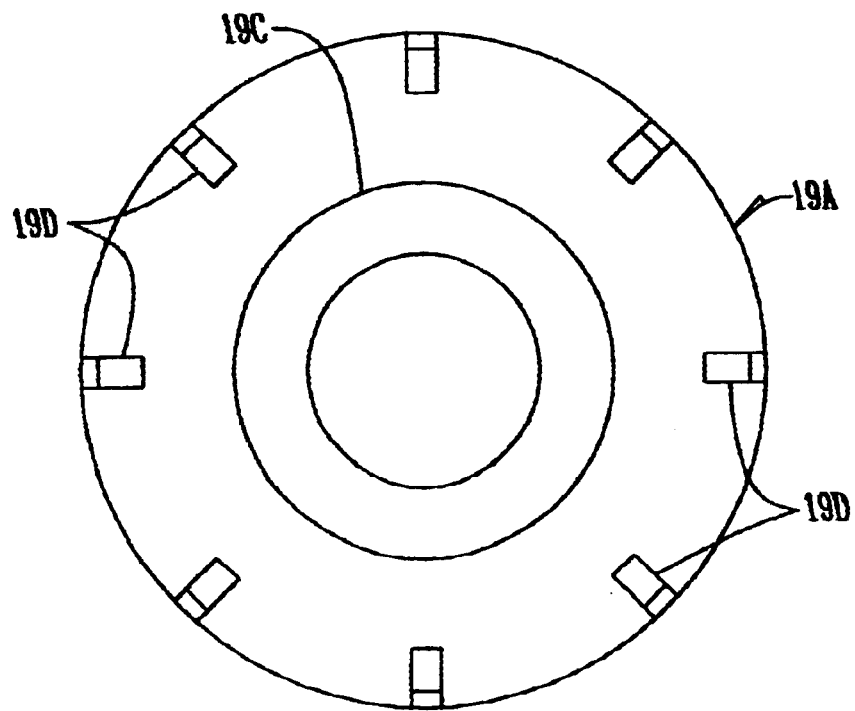
FIG. 7 is a plan view of a retaining ring.

As shown in FIGS. 2, 3, 3A, and 4, a pair of elongated slots 28 are formed in ring 20. The slots 28 are comprised of a wide portion 20 which terminates into a narrow elongated portion 32. As shown in FIG. 4, a groove 34 is formed underneath narrow portion 32 and dwells under the lower edge 36 of the narrow portion 32.

Figure 1:
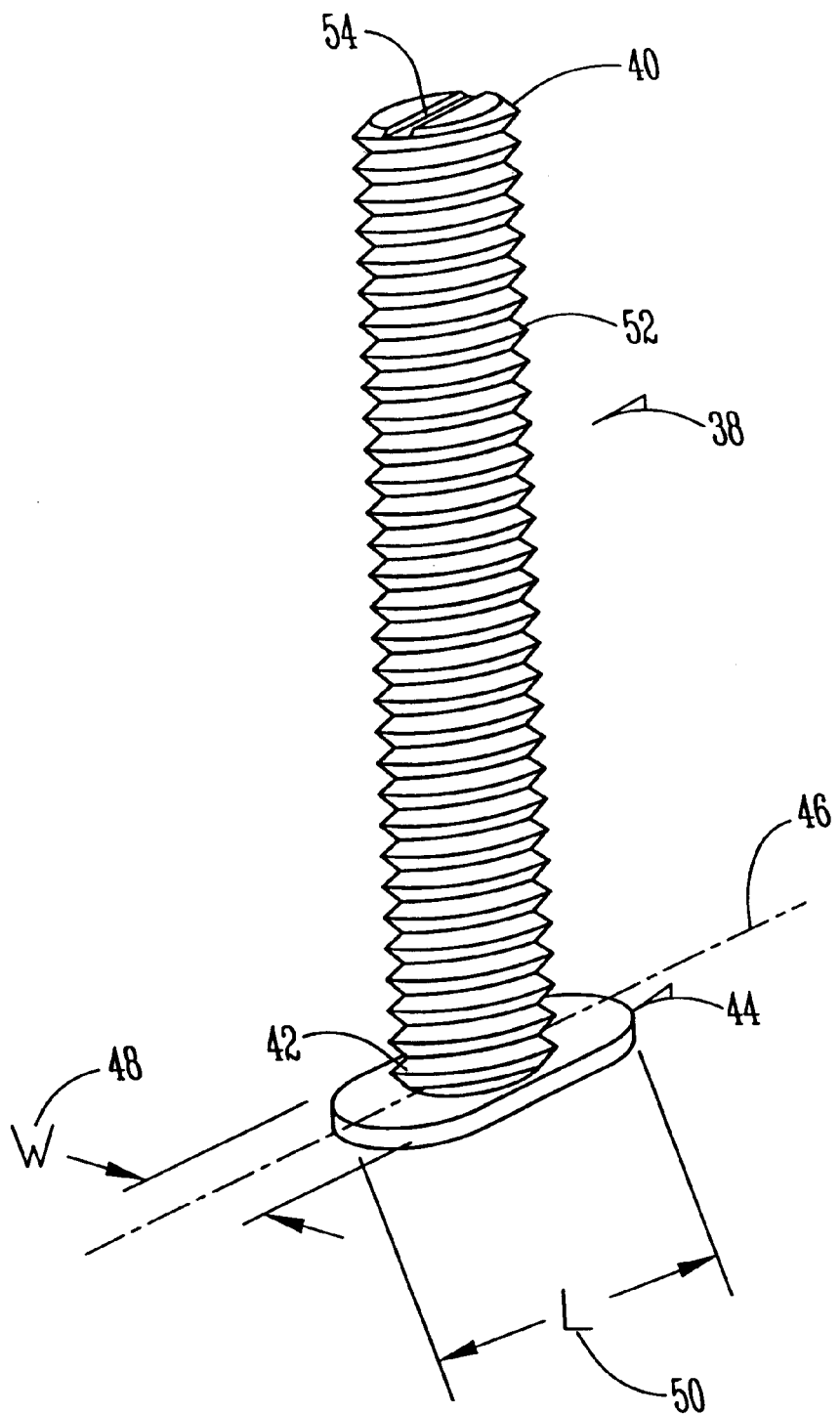
FIG. 1 is an enlarged perspective view of the bolt of this invention.
Figure 2:
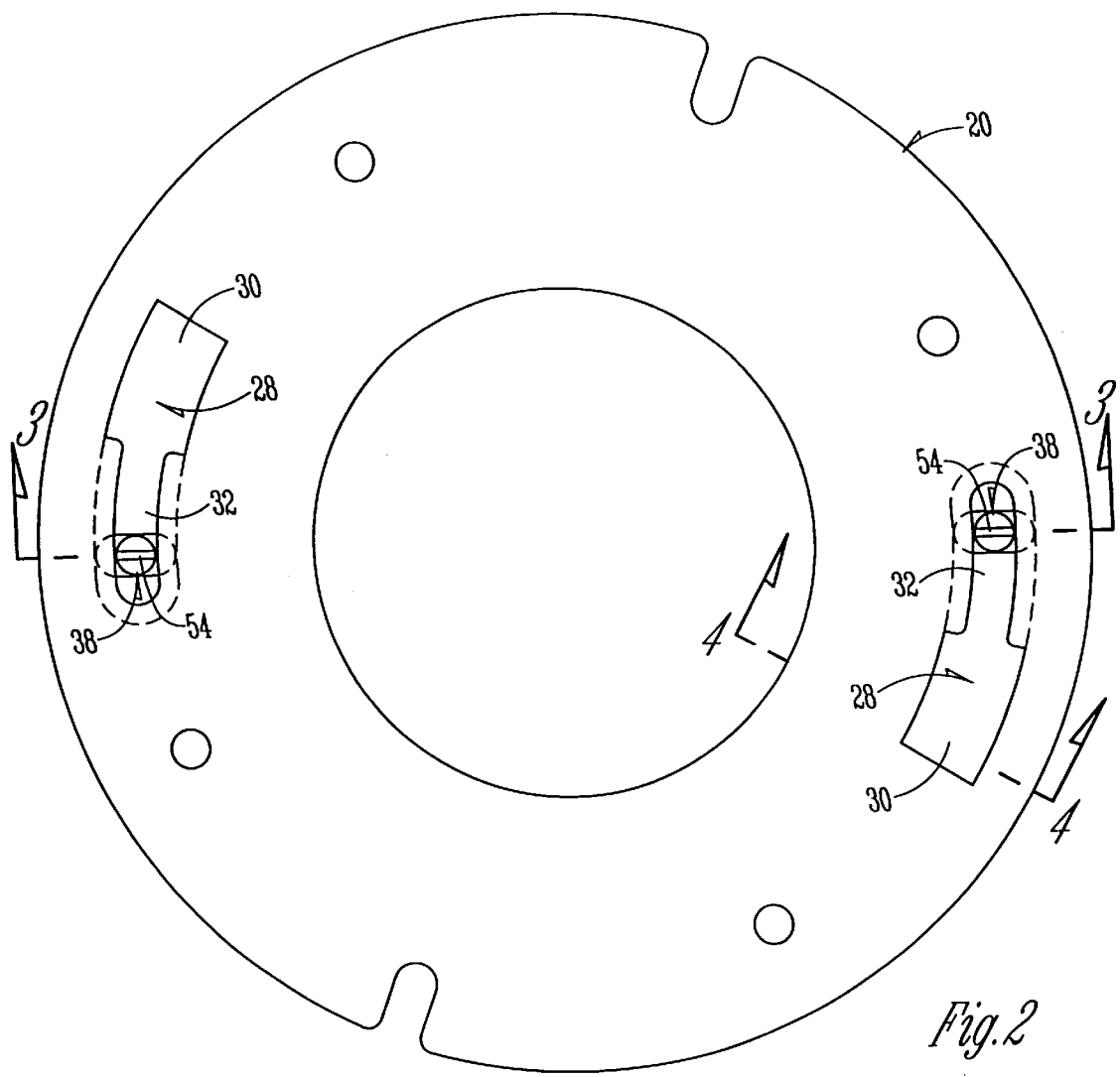
FIG. 2 is a reduced scale plan view of the floor ring of this invention.

As shown in FIG. 1, a bolt 38 has an upper end 40 and a lower end 42. A planar head 44 is located on the lower end 42 and has a center axis 46. The width of head 44 is designated by W 48, and the length thereof is designated by the letter L 50 (FIG. 1). The threaded shank 52 extends from the lower end 42 to the upper end 40. An elongated straight slot 54 is formed in the upper end of the bolt to receive the blade of a flat screwdriver. The slot 54 is straight and dwells in the same plane and extends in the same direction as the center axis 46 in the head 44.

To install the stool 12, the floor ring 20 is set in place on the floor surface 10 with a bolt 48 extending upwardly from each of the slots 28. The nuts 56 are either in a loosened condition or are not even installed on the upper ends of the bolts 38 at that point in time. Typically, the heads 44 of the bolts are inserted into the slots 28 through the wide portion 30 thereof, and can be moved into the narrow portions 32 thereof either manually or by rotating the floor ring. The wax ring 26 is then located in its conventional position, and the stool is thereupon lowered onto the floor ring 20 so that the bolts 38 can extend through apertures 58 in the base of the stool 12.

The installer can then observe the position of the slots 54 at the top end of bolts 48 and if they are not in a position transverse to what the operator knows the position of the slots 28 to be, he can rotate the bolt manually about its axis to cause the slot 54 to extend laterally or transverse with respect to the narrow portion 32 of the slots 28. This will prevent the bolt from being pulled upwardly through the narrow portion of the slot by reason of the upper portion of the planar head 44 bearing against the lower edge 36 of the groove 34 which extends around the narrow portion 32 of slot 28. This function prevents any opportunity for the tightening of bolt 56 to cause the bolt to pull through the narrow slot portion 32 as will be the case if the center axis 46 of the head 44 were in alignment with the longitudinal axis of the narrow portion 32.

The method of this invention prevents the lost time occasioned by those circumstances when the longitudinal or center axis of the planar head is in alignment with the longitudinal axis of the narrow portion 32 of the slot 28 wherein the bolt 28 will be pulled through the narrow portion 32 of the slot 28 when the nut 56 is tightened.

DESCRIPTION OF AN ALTERNATE FORM OF THE INVENTION

With reference to FIGS. 5—8, the numeral 10A designates the base of a toilet stool. The numeral 11A designates the toilet bowl cap and the numeral 12A designates the toilet bolt. A seal ring 13A on the base of the cap serves to achieve a water tight fit. A recess space 14A on the base of the bolt cap provides a space for the bolt nut 15A and the washer 16A.

Figure 8:
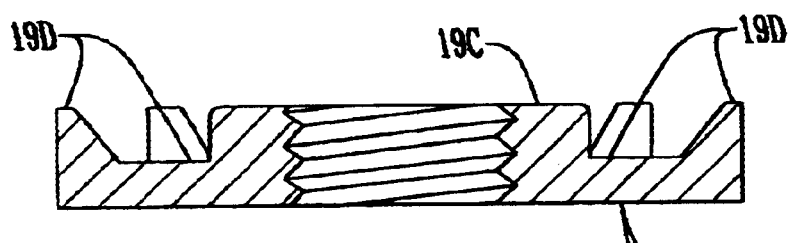
FIG. 8 is a sectional view of the ring of FIG. 7.

A retaining ring 19A is comprised of flexible material such as rubber or the like. Ring 19A has a center opening 19B (FIG. 6) with internal threads. The center portion 19C of ring 19A comprised a center hub of greater thickness. Raised knobs 19D on ring 19A facilitate the manual turning and tightening of the ring (FIG. 8)

The numeral 20A designates the elongated head of the bolt. A toilet floor flange 21A is connected to the sanitary system. The toilet bowl cap 11A has a threaded opening 22B to provide means for screwing down the cap on the bolt 12A for a secure and water tight connection. The numeral 23A (FIG. 6) designates the indicia mark on the top of the bolt in line with the wide part of the bolt head, as previously discussed. The numeral 23 designates the floor surface. Slots 24A–25A in the toilet floor flange are used for sliding the bolt into position. The retaining ring 19A stabilizes the bolts to facilitate the lowering of the toilet stool 10A on to the bolts. The caps 11A protect the bolts 12A from rust and overcome all the problems associated with conventional bolt caps.

Thus, it is seen that this invention will achieve at least all of its stated objectives.

What is claimed is:

1. A retainer ring for retaining a threaded bolt within an aperture in a support system, comprising, a flat solid flexible member of continuous construction having the flexible qualities of rubber or the like with a continuous unbroken center aperture having continuous uninterrupted threads extending around an interior surface of the aperture, the flexible member being sufficiently flexible to permit it to be longitudinally pushed onto the threaded shank of an elongated bolt of a threaded diameter the same as that of the threaded aperture in the flexible member and to thereupon engage the threads in the aperture in intimate operative rotational engagement therewith.

2. The retainer ring of claim 1 wherein the flat flexible member is thicker around the aperture therein to better permit space for the formation of threads in the aperture.

3. The retainer ring of claim 1 wherein ribs are formed on an upper surface of the flat flexible member for facilitating the manual rotation thereof when mounted on a threaded bolt.

* * * * *